(12) United States Patent
Woodcock et al.

(10) Patent No.: US 11,821,421 B2
(45) Date of Patent: Nov. 21, 2023

(54) GEAR PUMPS USED IN FLUID PROCESSING LINES AND SEAL SYSTEMS FOR FLUID PROCESSING APPARATUSES

(71) Applicant: PSI-Polymer Systems, Inc., Conover, NC (US)

(72) Inventors: David C. Woodcock, Newton, NC (US); Joshua A. Bibey, Newton, NC (US)

(73) Assignee: PSI-POLYMER SYSTEMS, INC., Conover, NC (US)

( * ) Notice: Subject to any disclaimer, the term of this patent is extended or adjusted under 35 U.S.C. 154(b) by 475 days.

(21) Appl. No.: 16/899,278

(22) Filed: Jun. 11, 2020

(65) Prior Publication Data
US 2020/0392957 A1 Dec. 17, 2020

Related U.S. Application Data

(60) Provisional application No. 62/859,963, filed on Jun. 11, 2019.

(51) Int. Cl.
*F04C 15/00* (2006.01)
*F16J 15/3268* (2016.01)

(52) U.S. Cl.
CPC ....... *F04C 15/0038* (2013.01); *F16J 15/3268* (2013.01)

(58) Field of Classification Search
CPC .............................. F04C 15/0038; F04C 2/18
See application file for complete search history.

(56) References Cited

U.S. PATENT DOCUMENTS

| | | | |
|---|---|---|---|
| 4,336,213 A * | 6/1982 | Fox | F04C 13/001 366/77 |
| 6,179,594 B1 * | 1/2001 | Woodcock | F04C 15/0038 418/104 |
| 2013/0259729 A1 * | 10/2013 | Alexander | F01C 21/02 384/397 |

* cited by examiner

*Primary Examiner* — Anthony Ayala Delgado
(74) *Attorney, Agent, or Firm* — Michael Best & Friedrich LLP

(57) ABSTRACT

Seal systems are provided that use a variety of seals to seal fluid processing apparatuses, such as gear pumps, to facilitate the prevention of a leakage of fluids from the respective fluid processing apparatuses. Fluid apparatuses that use such seal systems are also provided. Methods of uses, making, and assembly of seal systems are further described herein.

24 Claims, 13 Drawing Sheets

DETAIL "C"

SECTION A-A

DETAIL "B"

DETAIL "C"

DETAIL "D"

DETAIL "E"

GEAR PUMPS USED IN FLUID PROCESSING LINES AND SEAL SYSTEMS FOR FLUID PROCESSING APPARATUSES

RELATED APPLICATION

The presently disclosed subject matter claims the benefit of U.S. Provisional Patent Application Ser. No. 62/859,963, filed Jun. 11, 2019, the disclosure of which is incorporated herein by reference in its entirely.

TECHNICAL FIELD

The subject matter disclosed herein relates to seals used in machinery to prevent leakage of fluids, and related apparatuses and systems. In particular, the subject matter disclosed herein relates to seal systems that can be used to seal apparatuses to prevent leakage of low to medium viscosity fluids, and apparatuses and systems that use such seals.

BACKGROUND

Various types of pumps are utilized in fluid transporting systems to develop and maintain a desired amount of flow energy in the fluid. Many of these pumps require at least one rotatable shaft to drive a mechanical energy-transferring device such as a piston, impeller, or gear. Typically, the rotational power or torque transmitted to the shaft is generated in a motor disposed remotely in relation to the pump housing. For example, a portion of the shaft can extend outside the housing through a bore in a wall of the housing for direct or indirect linkage to the motor. The shaft can be supported or mounted in the housing but must be free to rotate at the interface of the housing and shaft in accordance with the operation of the pump.

A clearance of operationally-significant magnitude therefore exists between the bore of the housing wall and the shaft, even in a case where a bushing, or like element, is employed at the shaft/housing or pump/atmosphere interface. It is recognized that over the range of operating pressures of the pump, this clearance presents a potential leakage point. Depending on the direction of the pressure gradient between the interior of the pump housing and the atmosphere, the leakage point may be characterized by fluid leaking out of the pump or air infiltrating into the pump. The leakage may contribute to a variety of undesirable conditions, including reduced pump efficiency, reduced economic life of the pump and related components, increased maintenance costs, and contamination or non-uniformity of the fluid being pumped. Accordingly, the pump should include some means for sealing the shaft at the interface.

A gear pump, which is utilized in several well-known applications to meter and discharge various types of fluids, may be a rotary, positive displacement pump, for example. Generally speaking, in some embodiments, such a gear pump can include a pair of intermeshing spur, single-helical or double-helical (i.e., herringbone) gears disposed in a housing having narrow internal dimensional tolerances. In such a configuration, one gear serves as the driving gear and is rotatable with a drive shaft, i.e., the shaft powered by a motor, while the other gear serves as the driven gear and is rotatable about an idler shaft. The shafts are mounted in journal bearings on each side of the gears. When transporting a fluid through the gear pump during operation, the gears create a pressure differential between a suction side and a discharge side of the gear pump housing. The fluid being transported by the gear pump is drawn into the housing at the suction side. The fluid is then carried by the teeth of each gear in spaces defined by those teeth and one or more internal surfaces of the housing and is pumped out on the discharge side. Such a configuration results in a relatively constant rate of fluid flow with a minimum amount of drifting or slippage. The flow rate is dependent on the rotational speed of the gears but is largely unaffected by viscosity variations and pressure differential variations across the gear pump.

The performance characteristics of such gear pumps make them useful in the processing of high-shear polymers such as rubber, polyvinyl chloride ("PVC"), and ethylene propylene diene monomer ("EPDM"), where pressure, volume and uniformity of the flowing material must be controlled. Such gear pumps can be used in a variety of fluid processing applications. For example, the gear pumps may be used to transport synthesis polymeric material from a reaction vessel. The gear pumps may also be used in fluid processing lines, or fluid processing systems in connection with an extruder.

A typical extruder can include an elongate barrel containing a rotating auger or screw. In some such embodiments, an extruder can receive a feed of liquefied polymer to be processed. In other embodiments, a hopper can be used to feed pellets or granules of the polymeric material to the extruder, where the material is heated and melted as it is forced along the length of the barrel by the auger or screw. In such a fluid processing application, the gear pump can be installed between the extruder and an extrusion die to pressurize and meter the polymer melt flow, and to dampen any pressure fluctuations or surges caused by the rotating screw of the extruder. Because the gear pump moves fluid more efficiently than the extruder and reduces the load on the extruder, the gear pump itself can be used to develop the high pressure needed in the fluid line. This aspect of the gear pump enables the discharge pressure of the extruder to be separately adjusted to a reduced level in better accord with the extruder's own optimal operating point. The gear pump may be installed in line with two or more extruders as part of a compounding or mixing process to obtain similar advantages. The gear pump may produce not only a high-pressure differential between the inlet and outlet fluid conduits communicating with the gear pump, but also a high-pressure differential between the interior of the gear pump and the atmosphere. Thus, due to the high-pressure differential, the problem of leakage in gear pumps may be potentially significant.

While such leaks can cause problems for high-shear polymers as mentioned above, the leakage problem is further exacerbated when the gear pump is used to process low to medium viscosity fluids. For example, in some processing of low to medium viscosity polymeric fluids, the bearings selected for the gear pump can typically be hydrodynamic and self-lubricating. Thereby, instead of using a separate lubrication method, such as a forced oil circulation system, the gear pump and bearings are designed with flow paths for diverting a portion of the incoming polymer melt flow and circulating that portion between the bearings and shafts prior to discharge from the gear pump. The radial clearance provided in the bearing permits a wedge-shaped polymeric film to develop between the journal and the bearing as the shaft rotates. As a result, a hydrodynamic pressure is generated in the film that is enough to float the journal portions of the shafts and support the loads applied to them. Since the journal portion of the rotating shaft does work on the polymeric film and induces shear stresses therein, the frictional heat energy produced raises the film temperature.

Consequently, the heated and pressurized low to medium viscosity polymer melt flowing near the shaft/housing interface has a high tendency to leak out from the pump. Previous sealing solutions that can be used with high viscosity fluids have not adequately controlled the leakage problem observed in gear pumps processing lower viscosity fluids.

Thus, it is widely accepted among persons skilled in the art that, despite past efforts, an ongoing need exists to provide fluid processing apparatuses, such as gear pumps, that have a sealing system that prevents the leaking of fluid during fluid processing operations, especially low to medium viscosity fluids being processed at low and/or high pressures.

SUMMARY

The subject matter disclosed herein relates to seals used in machinery to prevent leakage of fluids, and related methods, apparatuses and systems. In particular, the subject matter disclosed herein relates to seal systems for drive gear shafts of gear pumps used to seal the gear pumps to prevent leakage of low to medium viscosity fluids, as well as methods, apparatuses and systems that use such seals.

Thus, it is an object of the presently disclosed subject matter to provide seal systems that use a variety of seals to seal fluid processing apparatuses, such as gear pumps, as well as methods related thereto that can facilitate the prevention of a leakage of fluids from the respective fluid processing apparatuses. While one or more objects of the presently disclosed subject matter having been stated hereinabove, and which is achieved in whole or in part by the presently disclosed subject matter, other objects will become evident as the description proceeds when taken in connection with the accompanying drawings as best described hereinbelow.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures, in which.

Figure 1:
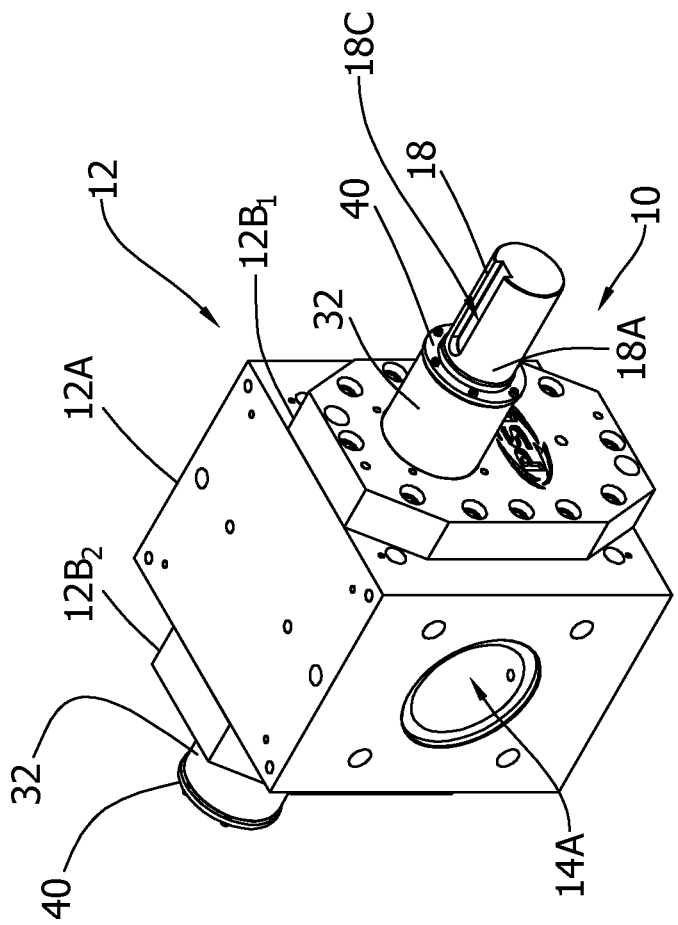
FIG. 1 illustrates a perspective view of an embodiment of a gear pump according to the present subject matter.
Figure 2:
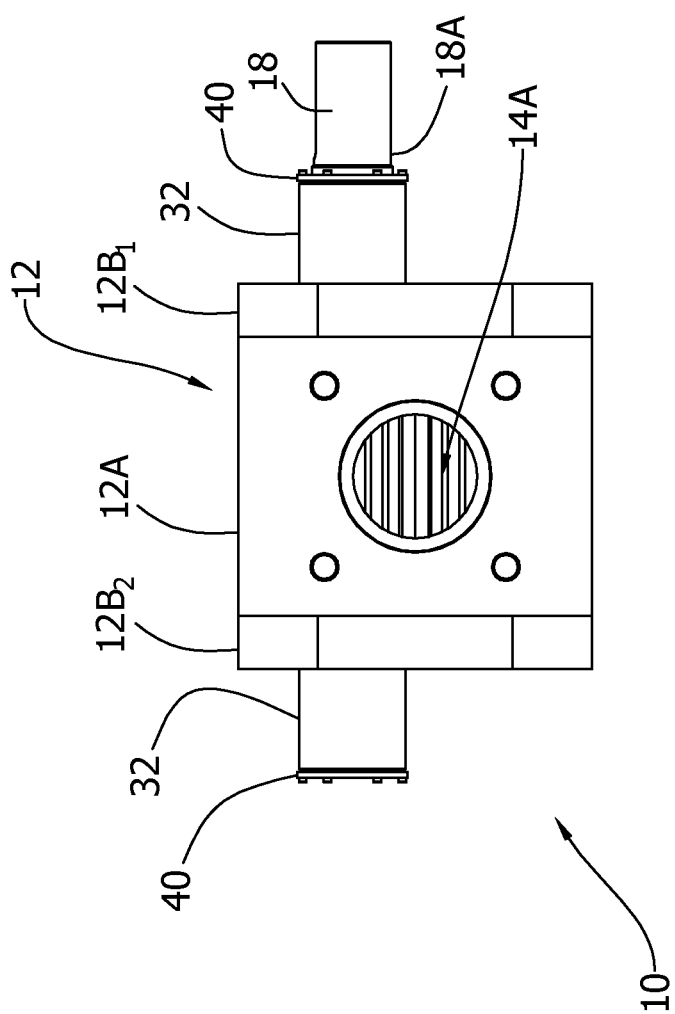
FIG. 2 illustrates a front plan view of the embodiment of the gear pump according to FIG. 1.

Repeat use of reference characters in the present specification and drawings is intended to represent the same or analogous features or elements of the present subject matter.

DETAILED DESCRIPTION

Reference now will be made to the embodiments of the present subject matter, one or more examples of which are set forth below. Each example is provided by way of an explanation of the present subject matter, not as a limitation. In fact, it will be apparent to those skilled in the art that various modifications and variations can be made in the present subject matter without departing from the scope or spirit of the present subject matter. For instance, features illustrated or described as one embodiment can be used on another embodiment to yield still a further embodiment. Thus, it is intended that the present subject matter cover such modifications and variations as come within the scope of the appended claims and their equivalents. It is to be understood by one of ordinary skill in the art that the present discussion is a description of exemplary embodiments only and is not intended as limiting the broader aspects of the present subject matter, which broader aspects are embodied in exemplary constructions.

Although the terms first, second, right left, front, back, etc. may be used herein to describe various features, elements, components, regions, layers and/or sections, these features, elements, components, regions, layers and/or sections should not be limited by these terms. These terms are only used to distinguish one feature, element, component, region, layer or section from another feature, element, component, region, layer or section. Thus, a first feature, element, component, region, layer or section discussed below could be deemed a second feature, element, component, region, layer or section without departing from the teachings of the disclosure herein.

Similarly, when a layer or coating is being described in the present disclosure as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

Embodiments of the subject matter of the disclosure are described herein with reference to schematic illustrations of embodiments that may be idealized. As such, variations from the shapes and/or positions of features, elements or components within the illustrations as a result of, for example but not limited to, user preferences, manufacturing techniques and/or tolerances are expected. Shapes, sizes and/or positions of features, elements or components illustrated in the figures may also be magnified, minimized, exaggerated, shifted or simplified to facilitate explanation of the subject matter disclosed herein. Thus, the features, elements or components illustrated in the figures are schematic in nature and their shapes and/or positions are not intended to illustrate the precise configuration of the subject matter and are not intended to limit the scope of the subject matter disclosed herein.

It is to be understood that the ranges and limits mentioned herein include all ranges located within the prescribed limits (i.e., subranges). For instance, a range from about 100 to about 200 also includes ranges from 110 to 150, 170 to 190, 153 to 162, and 145.3 to 149.6. Further, a limit of up to about 7 also includes a limit of up to about 5, up to 3, and up to about 4.5, as well as ranges within the limit, such as from about 1 to about 5, and from about 3.2 to about 6.5.

The term "thermoplastic" is used herein to mean any material formed from a polymer which softens and flows when heated; such a polymer may be heated and softened a number of times without suffering any basic alteration in characteristics, provided heating is below the decomposition temperature of the polymer. Examples of thermoplastic polymers include, by way of illustration only, polyolefins, polyesters, polyamides, polyurethanes, acrylic ester polymers and copolymers, polyvinyl chloride, polyvinyl acetate, etc. and copolymers thereof.

The subject matter disclosed herein relates to seal systems for rotary shafts in fluid processing apparatuses and related methods, apparatuses and systems. For example, the seal systems can include U-seals used in conjunction with a helically-channeled sealing sleeve to seal apparatuses and prevent leakage of fluids (particularly molten polymers). The seal systems can be used in fluid processing apparatuses, particularly polymer gear pumps, that use and/or process fluids having low to medium viscosity at low or high pressures and temperatures while still preventing leakage of the fluids from the apparatus during processing.

Material leakage on polymer gear pumps can occur when the viscosity of the process material is not enough to create a seal in the close tolerance gaps between the a helically-channeled sealing sleeve, such as a visco seal, and the driver gear shaft within a gear pump. Materials that fall into these categories include hot melt adhesives, high melt flow index (MFI) polypropylene and other low viscosity polymers where the melted polymer can readily pass through tight clearances. U-seals used in conjunction with the helically-channeled sealing sleeves can seal against materials possessing a melt flow index as high as about 1800. This is achieved by marrying close-gap Visco Seal technology with a U-seal configuration into a seal system that holds its sealing properties and is resistance to wear. Material leakage for adhesives and low viscosity polymers is an ongoing problem that fluid processors face when using gear pumps for these applications. U-seals used in conjunction with the helically-channeled sealing sleeve provides a way to prevent that from happening and assures that gear pumps will perform as advertised without creating undue housekeeping and related safety issues.

For example, as disclosed herein, a seal system for use in fluid processing within a fluid processing apparatus, such as a gear pump, to prevent leakage of a low viscosity fluid is provided. The seal system can comprise a helically-channeled sealing sleeve disposed around a cylindrical surface of a driver gear shaft of a fluid processing apparatus. The helically-channeled sealing sleeve can comprise a chamber groove at a distal end of the helically-channeled sealing sleeve away from the housing when installed. The seal system can also comprise a U-seal disposed around the cylindrical surface of the driver gear shaft of the gear pump residing against the cylindrical surface of the driver gear shaft within the chamber groove of the helically-channeled sealing sleeve. Further, the seal system can comprise a static sleeve-housing seal disposed between a surface of the helically-channeled sealing sleeve and the housing of the gear pump. For example, the static sleeve-housing seal can comprise one or more O-rings, a sealing epoxy, one or more gaskets, or packing as used in fluid processing apparatuses.

For example, in some embodiments, as disclosed herein, a seal system for use in fluid processing can comprise a helically-channeled sealing sleeve that can include a body having an outer surface and an internal cylindrical inner bore that is configured to closely surround a cylindrical surface of a driver gear shaft of the fluid processing apparatus with a helical channel grooved within the internal cylindrical inner bore. The helically-channeled sealing sleeve can be disposed around the cylindrical surface of the driver gear shaft of the fluid processing apparatus and extend between the driver gear shaft and a housing of the fluid processing apparatus with the body of the helically-channeled sealing sleeve comprising a chamber groove at a distal end of the body away from the housing when installed for accommodating other seals.

For example, the seal system can also comprise a U-seal that can include an annular body having an outer surface and inner surface with the annular body comprising a center base forming a rear end of the U-seal and an inner lip and an outer lip extending outward from the center base forming a front end of the U-seal. The U-seal can be disposed around the cylindrical surface of the driver gear shaft of the fluid processing apparatus with the inner surface of the annular body and the inner lip residing against the cylindrical surface of the driver gear shaft within the chamber groove of the helically-channeled sealing sleeve. Additionally, the seal system can comprise a back-up sealing ring comprising an annular body having an outer surface and inner surface. The back-up sealing ring can be disposed around the cylindrical surface of the driver gear shaft of the fluid processing apparatus with the inner surface of the annular body of the back-up ring residing against the cylindrical surface of the driver gear shaft within the chamber groove of the helically-channeled sealing sleeve against the center base at the rear end of the U-seal to support the U-seal.

Further, the seal system can comprise a follower plate extending around the cylindrical surface of the driver gear shaft of the fluid processing apparatus and secured to the distal end of the body of the helically-channeled sealing sleeve to close the chamber groove to form a seal chamber within which the U-seal and the back-up sealing ring reside. The follower plate can comprise a support end that is proximal to the back-up sealing ring that provides mechanical support to the U-seal and back-up sealing ring. The seal system can also comprise a wear guide that comprises an annular body having an outer surface and inner surface. The wear guide can be positioned around the cylindrical surface of the driver gear shaft of the fluid processing apparatus between the driver gear shaft and the follower plate to prevent metal to metal contact between the follower plate and the drive gear shaft of the fluid processing apparatus. Further, the seal system can comprise a static sleeve-housing seal, such as an O-ring, disposed around the driver gear shaft of the fluid processing apparatus between the outer surface of the helically-channeled sealing sleeve and the housing of the fluid processing apparatus.

Figure 3A:
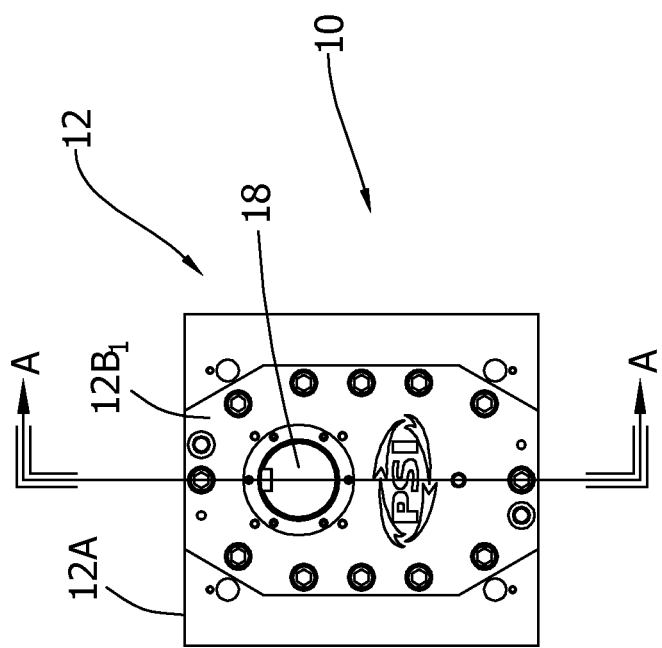
FIG. 3A illustrates a side plan view of the embodiment of the gear pump according to FIG. 1.
Figure 3B:
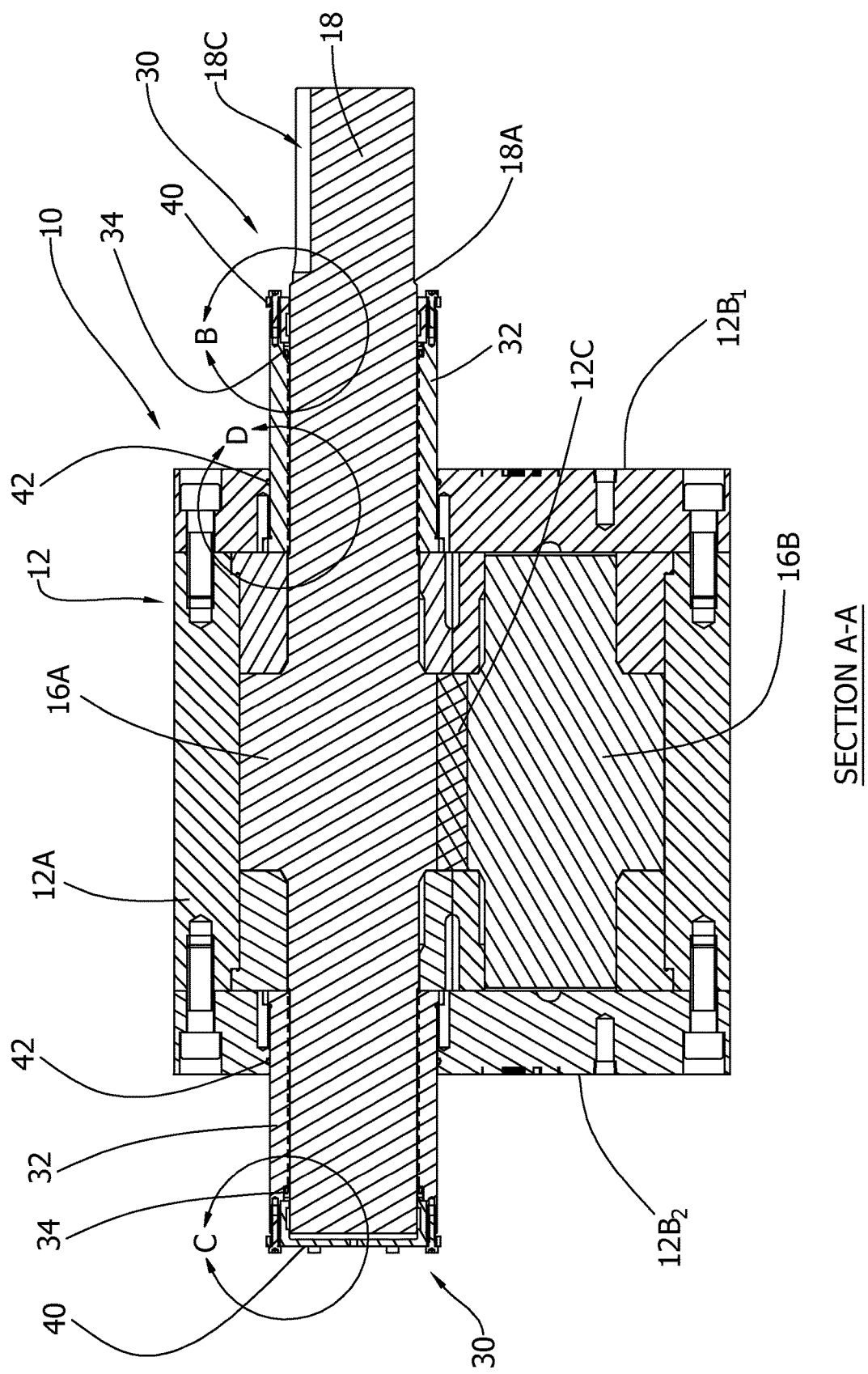
FIG. 3B illustrates a cross-sectional view of the embodiment of the gear pump according to FIG. 1 taken along the lines A-A in FIG. 3A.
Figure 4:
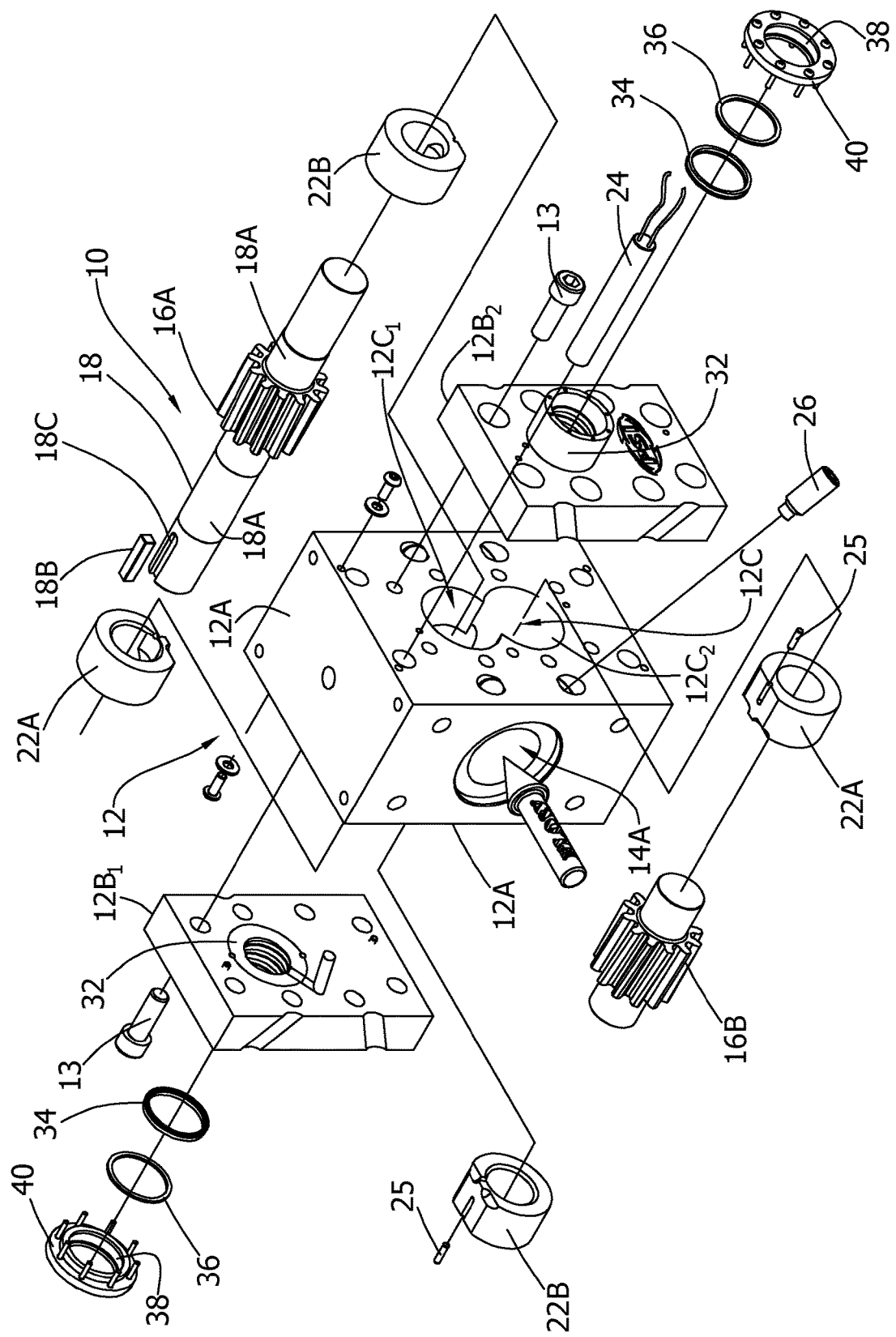
FIG. 4 illustrates an exploded perspective view of the embodiment of the gear pump according to FIG. 1.
Figure 7A:
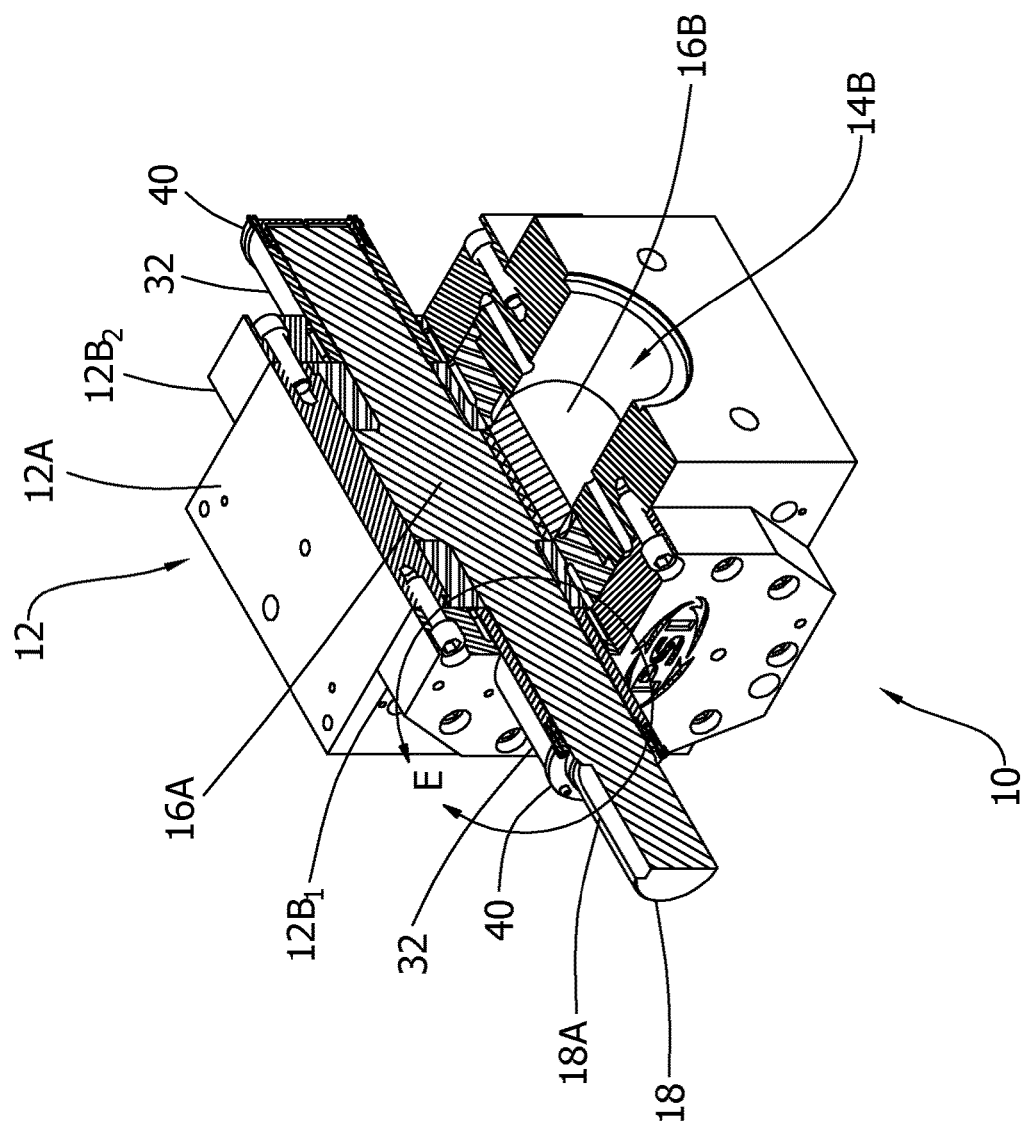
FIG. 7A illustrates a partial cross-sectional view of the embodiment of the gear pump according to FIG. 1.
Figure 7B:
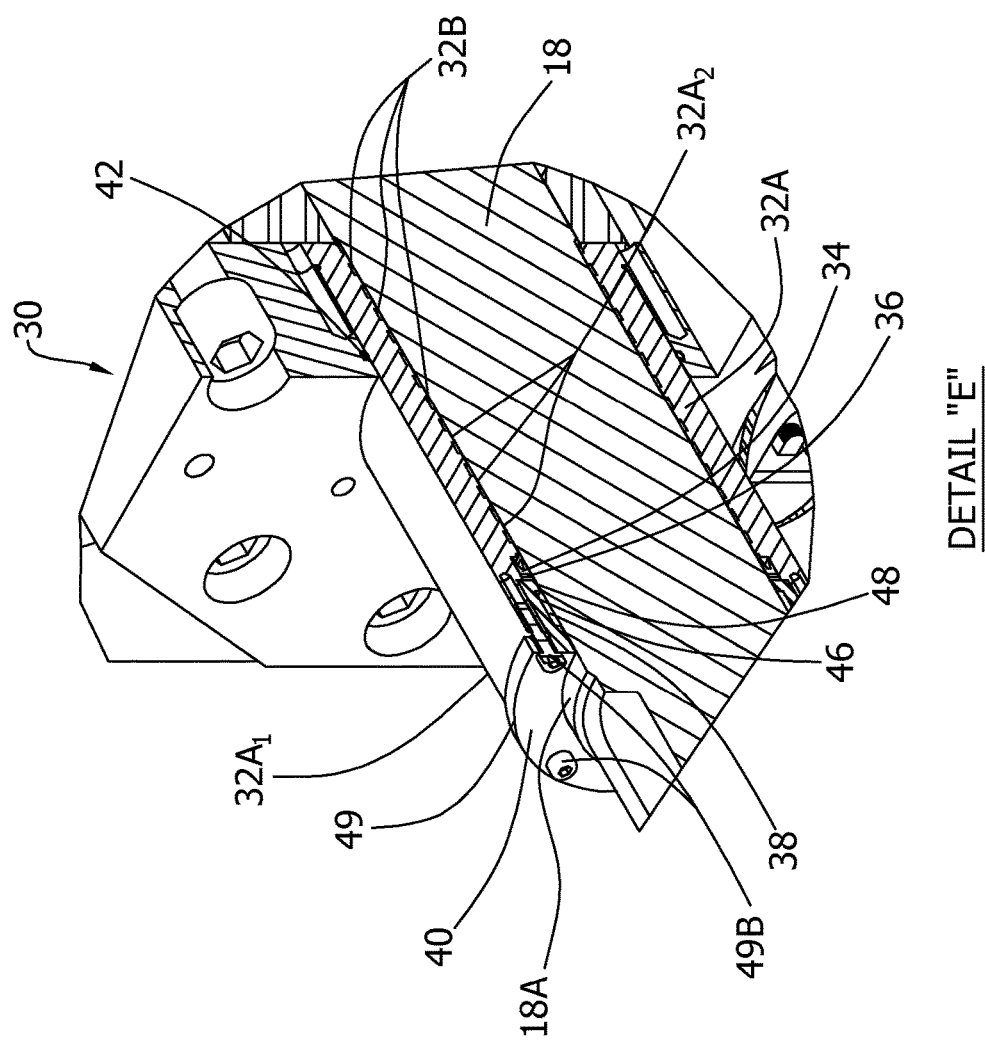
FIG. 7B illustrates a magnified cross-sectional view of the embodiment of the gear pump according to FIG. 1 as taken from section E in FIG. 7A.

Refer to FIGS. 1-4 and 7A, a fluid processing apparatus 10 is provided. In the embodiment shown, the fluid processing apparatus 10 is a gear pump. The gear pump 10 can comprise a housing 12 comprising a housing body 12A and first and second side plates 12B$_1$, 12B$_2$ with the housing body 12A including an inlet fluid flow bore 14A and an outlet fluid flow bore 14B (see FIG. 7B) through which a fluid being processed enters and exits, respectively. As seen in FIGS. 3B and 4, the housing body 12A can comprise a gear housing cavity 12C that can be in fluid communication with the inlet fluid flow bore 14A and the outlet fluid flow bore. The gear pump 10 can also comprise an upper gear 16A and a lower gear 16B that can reside inside the gear housing cavity 12C. The upper gear 16A and the lower gear 16B can mesh together in alignment with the inlet fluid flow bore 14A and the outlet fluid flow bore. The gear housing cavity 12C is configured to allow the synchronized rotation of the upper gear 16A end the lower gear 16B within the housing 12.

The upper gear 16A is engaged by a drive gear shaft 18 that extends through apertures in the first side plate 12B$_1$, the housing cavity 12C of the housing body 12A, and the back-side plate 12B$_2$. The upper gear 16A can thus comprise a drive gear and the lower gear 16B can comprise a driven gear that is contained with the housing 12 and in some embodiments, more particularly, the housing body 12A. The upper gear 16A and the drive shaft 18 can be a single unitary integral gear in some embodiments. In other embodiments, the upper gear 16A can be separate from the drive shaft 18 and can be securely fitted to the drive shaft 18 such that the upper gear 16B rotates as the drive shaft 18 rotates. The drive shaft 18 can have a drive side which is the side of the shaft 18 that couples to a drive motor (not shown) on one side of the housing 12 that drives the gear pump 10 and a non-drive side which is the side of the shaft 18 that extend on the other side of the housing 12 that is distal from the drive motor. The drive gear shaft 18 can have a cylindrical outer surface 18A and a keystock 18B (see FIG. 4) that fits and is securable in a keystock channel 18C in the cylindrical outer surface 18A on the drive side of the shaft 18 to permit rotatable coupling with a drive motor. As shown in the exploded view of FIG. 4, each of the drive gear 16A and the driven gear 16B can have a right hand bearing 22A and a left hand bearing 22B that reside on the shafts of the drive gear 16A and the driven gear 16B that reside inside the housing 12 with the drive gear 16A and the driven gear 16B. The right hand bearing 22A and the left hand bearing 22B facilitate rotational capabilities of the drive gear 16A and the driven gear 16B within the housing 12. The right-hand bearings 22A and left-hand bearings 22B can be secured in place within the housing 12 with hardened dowel pins 25, for example.

The first and second side plates 12B$_1$, 12B$_2$ can be secured to the housing body 12A closing the housing cavity 12C on either end. For example, the first and second side plates 12B$_1$, 12B$_2$ can be secured to the housing body 12A with fasteners, such as bolts or screws, 13. The gear pump 10 can also comprise one or more cartridge heaters 24 that can be inserted into the housing body 12A for heating the housing as needed during operation to facilitate fluid flow. When manufactured, the gear pump can have one or more transducer plugs 26 that can be inserted into ports in the housing body 12A where a user can insert pressure measuring instruments. The user can remove the transducer plugs 26 to insert the instruments. The transducer plugs 26 would prevent leaks if those particular ports are not used. The cartridge heaters 24 can be used to heat the housing body 12A to an operating temperature that is the same or similar to the temperature of the polymer flow to facilitate the flowing of the polymer through the gear pump 10.

Figure 5A:
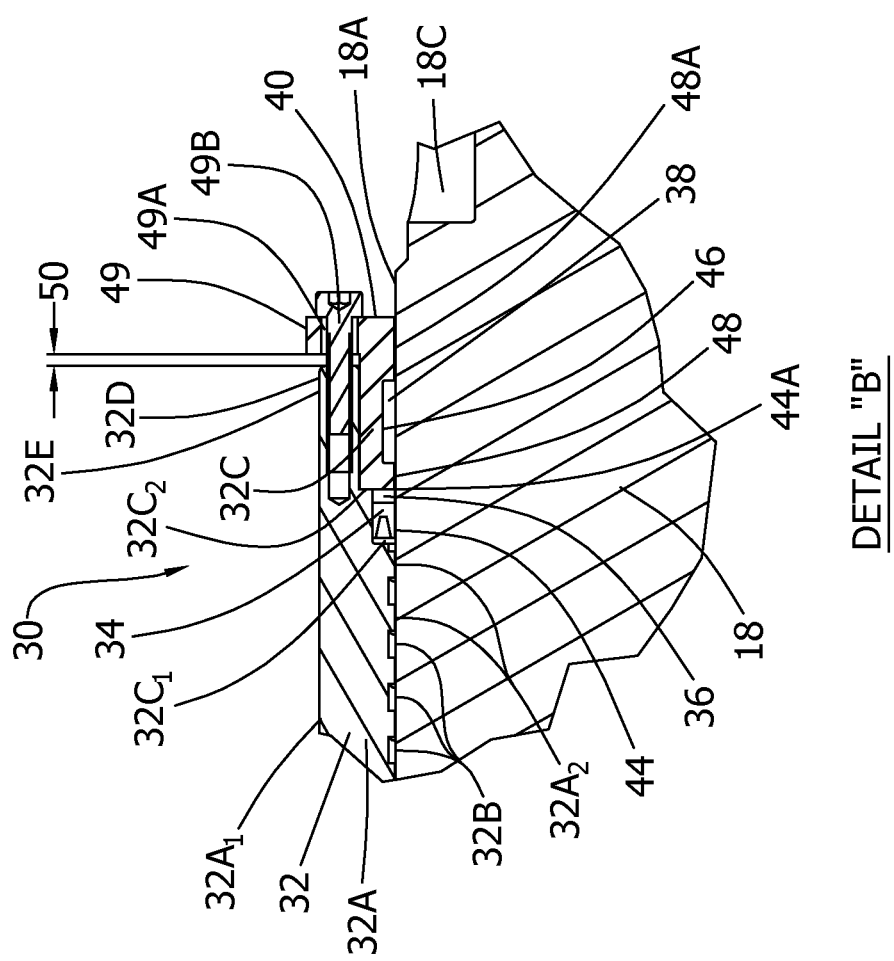
FIG. 5A illustrates a magnified a cross-sectional view of the embodiment of the gear pump according to FIG. 1 as taken from section B in FIG. 3B of an embodiment of a portion of a seal system on a forward end of a drive shaft between a motor and a gear on the drive shaft.
Figure 5B:
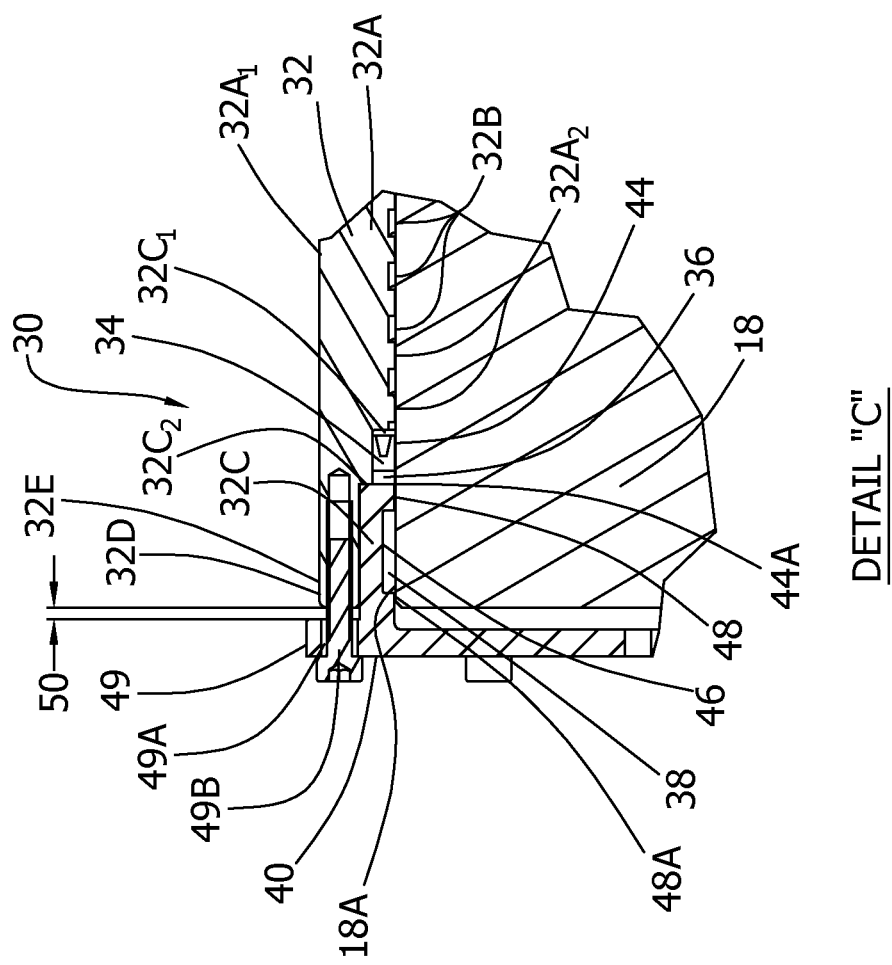
FIG. 5B illustrates a magnified a cross-sectional view of the embodiment of the gear pump according to FIG. 1 as taken from section C in FIG. 3B of an embodiment of a portion of a seal system on a rear end of the drive shaft.

To prevent leakage from the gear pump 10 which puts the fluids being processed under high pressure during operation, the gear pump 10 can include a seal system 30 as at least partially shown in FIGS. 3B-5B, and 6 that can be installed on one or both sides of the drive shaft 18 that extend outward from the housing 12. As shown in FIGS. 4, 5A, and 5B in more detail, the seal system 30 can have similar components on the drive shaft 18 on either side of the drive gear 16A. For example, as shown in FIG. 5A on the motor side, or drive side, of the drive gear shaft 18, a helically-channeled sealing sleeve 32, a U-seal, or lip seal, 34, a back-up sealing ring 36, and a wear guide, or guide band, 38 can be secured around the cylindrical outer surface 18A of the drive shaft 18 between the housing 12 and the motor and in communication with the housing 12 of the fluid processing apparatus 10 to facilitate the sealing of the housing 12 around the drive shaft 18 to prevent leakage of fluids being processed on the drive side of the housing. A follower plate 40 can also be positioned around the cylindrical outer surface 18A of the drive shaft 18 and attached to the helically-channeled sealing sleeve 32 to support one or more of the other components of the seal system 30 on the drive side of the drive shaft 18 and facilitate in sealing housing on that drive side.

Similarly, as shown in FIG. 5B on the non-drive side of the drive gear shaft 18 on the opposite side of the housing 12 from the motor, the seal system 30 can also comprise a helically-channeled sealing sleeve 32, a U-seal 34, a back-up sealing ring 36, and a wear guide 38 that can be secured around the cylindrical outer surface 18A of the drive shaft 18 in communication with the housing 12 of the fluid processing apparatus 10 to facilitate the sealing of the housing 12 around the drive shaft 18 to prevent leakage of fluids being processed on the non-drive side of the housing. As shown in FIG. 5B, a follower plate 40 can also be positioned around the cylindrical outer surface 18A and over an end of the drive shaft 18 to cap the end of the drive shaft 18 within the follower plate 40. The capping follower plate 40 can be attached to the helically-channeled sealing sleeve 32 on the non-drive side of the drive shaft 18 to support one or more of the other components the seal system 30 on the motor side of the drive shaft 18 and facilitate in sealing the housing 12 on that non-drive side. While shown as a capping follower plate 40 in FIG. 5B on the non-drive-side of the drive shaft 18, it is noted that a follower plate 40 like the follower plate on the drive side that slides onto the cylindrical outer surface 18A of the drive shaft 18 and does not cap the end of the drive shaft 18 can also be used. Additionally, depending on the configuration of the fluid processing apparatus 10 and its housing 12, the drive shaft 18 may not extent through the housing 12 on the non-drive side and may not require the components of the seal system 30 on that end of the drive shaft 18.

Thus, the seal system 30 can comprise on either side of the drive gear 16A of the drive shaft 18 a helically-channeled sealing sleeve 32, a U-seal, or lip seal, 34, and a static sleeve-housing seal 42 as shown in FIG. 3B. For example, the seal system 30 can comprise on one or both sides of the drive shaft the helically-channeled sealing sleeve 32, the U-seal 34, a back-up sealing ring 36, a wear guide 38, a follower plate 40, and the static sleeve-housing seal 42 as shown in FIGS. 3B-5B and 6. For example, the static sleeve-housing seal 42 can comprise one or more O-rings, a sealing epoxy, one or more gaskets, or packing as used in fluid processing apparatuses that is placed between the housing of the fluid processing apparatus and a surface of the helically-channeled sealing sleeve 32. The seal system 30 and its components are explained in more detail below.

Figure 6:
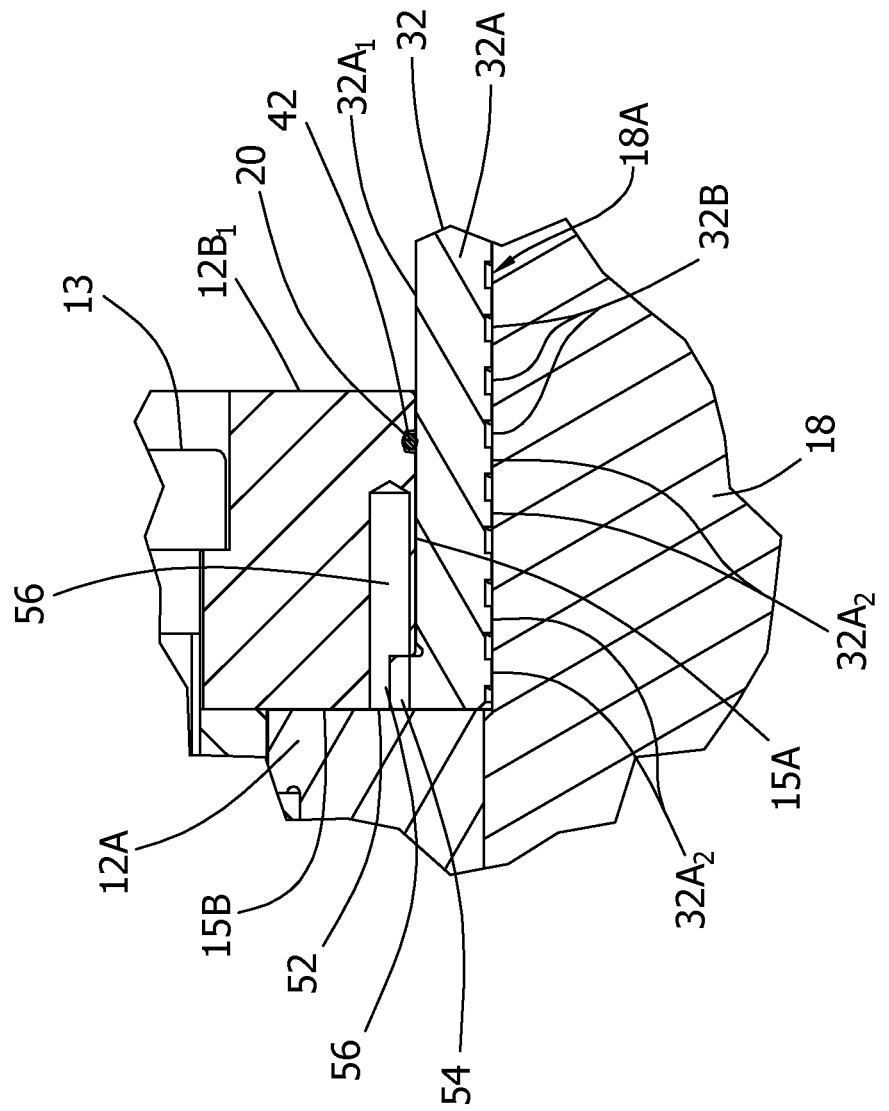
FIG. 6 illustrates a magnified cross-sectional view of the embodiment of the gear pump according to FIG. 1 as taken from section D in FIG. 3B.

Referring to FIGS. 3B and 5A-10, the seal system 30 is generally provided to prevent or reduce leakage during fluid processing within the fluid processing apparatus, such as the gear pump 10. While shown as being on both sides of the housing 12 of the gear pump 10, it is noted that the seal system 30 can be on either or both sides of the gear pump 10 adjacent and in conjunction with the extension of the driver gear shaft 18 through the housing body 12A of housing 12. The seal system 30 can comprise a helically-channeled sealing sleeve 32 disposed around the cylindrical surface 18A of the driver gear shaft 18 of the gear pump 10. The helically-channeled sealing sleeve 32 extends between the driver gear shaft 18 and the housing 12 of the gear pump 10 with the helically-channeled sealing sleeve 32 comprising a chamber groove 32C at a distal end 32D of the helically-channeled sealing sleeve 32 away from the housing 12 when installed. The seal system 30 can also comprise the U-seal 34 disposed around and residing against the cylindrical surface 18A of the driver gear shaft 18 of the gear pump 10 within the chamber groove 32C of the helically-channeled sealing sleeve 32. Additionally, the seal system 30 can comprise the back-up sealing ring 36 disposed around the cylindrical surface 18A of the driver gear shaft 18 of the gear pump 10 within the chamber groove 32C of the helically-channeled sealing sleeve 32 against a rear end of the U-seal 34 to support the U-seal 34. The seal system 30 can also comprise a follower plate 40 secured to the distal end 32D of the helically-channeled sealing sleeve 32 to close the chamber groove 32C to form a seal chamber 44 within which the U-seal 34 and the back-up sealing ring 36 can reside. The wear guide 38 can be positioned around the cylindrical surface 18A of the driver gear shaft 18 of the gear pump 10 between the driver gear shaft 18 and the follower plate 40. Further, the seal system 30 can comprise the static sleeve-housing seal 42 as shown in FIG. 6 that can be disposed around and can reside against an outer surface $32A_1$ of the helically-channeled sealing sleeve 32 between the helically-channeled sealing sleeve 32 and the housing 12 of the gear pump 10.

Referring to FIGS. 5A-7B in more retail, the seal system 30 as shown around the driver gear shaft 18 on the drive side of the shaft 18 to prevent leakage of a low viscosity fluid being processed through the gear pump 10. As stated above, a seal system 30 can be installed on either or both sides of the housing 12 of the gear pump 10 around the driver gear shaft 18. The helically-channeled sealing sleeve 32 of the seal system 30 can comprise a body 32A having the outer surface $32A_1$ and an internal cylindrical inner bore $32A_2$ that is configured to closely surround a cylindrical surface 18A of the driver gear shaft 18 of the gear pump 10. The helically-channeled sealing sleeve 32 can have a helical channel 32B grooved within the internal cylindrical inner bore $32A_2$. The helically-channeled sealing sleeve 32 can be disposed around the cylindrical surface 18A of the driver gear shaft 18 of the gear pump 10 and extend between the driver gear shaft 18 and the housing 12 of the gear pump 10. For example, the helically-channeled sealing sleeve 32 can reside between the driver gear shaft 18 and the first side plate $12B_1$. The body 32A of the helically-channeled sealing sleeve 32 can comprise the chamber groove 32C at the distal end 32D of the body 32A away from the housing, generally 12, when installed for accommodating other seals. In some embodiments, as shown in FIGS. 5A and 5B, the chamber groove 32C can comprise a shallower groove portion $32C_1$ on the interior that can form the seal chamber 44 and a deeper groove portion $32C_2$ that receives a portion of the follower plate 40. This two-tiered groove creates an abutment for the follower plate 40 to reside against to ensure space for the seal chamber 44 after tightening of the securement elements that hold the follower plate 40 to the helically-channeled sealing sleeves 32 as described further below.

An example of such a helically-channeled stealing sleeve 32 can be found in U.S. Pat. No. 4,336,213, which is incorporated herein in its entirety. The helically-channeled sealing sleeves 32 can be provided directly at the interface between the housing 12 and the shaft 18 within some embodiments of the fluid processing apparatus, such as the gear pump 10, and can use the polymeric material being processed itself to help create a seal. For example, the helically-channeled sealing sleeves 32 can be positioned between the first and second side plates $12B_1$, $12B_2$ and the shaft 18. The helically-channeled sealing sleeve 32 can have an outer rim 32E at the end of the sleeve opposite the housing 12. A plurality of holes, or securement apertures, 32F can be circumferentially disposed around an annular shoulder portion of the outer rim 32E, into which bolts may be inserted to tightly secure the helically-channeled sealing sleeve 32 to the housing 12 in an annular disposition with the shaft 18. When inserted onto the shaft, the cylindrical inner surface $32A_2$ of the helically-channeled sealing sleeve 32 abuts the outer surface 18A of the shaft 18. Accordingly, the inner surface $32A_2$ of the helically-channeled sealing sleeve 32 and the outer surface 18A of the shaft 18 together can define a clearance or gap which becomes the potential leakage point for the gear pump 10.

The helically-channeled sealing sleeve 32 can be characterized in part by the fact that the shallow helical channel 32B is formed on the inner surface $32A_2$ of the helically-channeled sealing sleeve 32. The helical channel 32B extends substantially along the entire length of the inner surface $32A_2$ up to the portion that forms the chamber groove 32C that circumferentially extends within the inner surface $32A_2$ at the distal end 32D. The orientation or "hand" of the helical path taken by the channel 32B can be opposite to that of the rotation of the shaft 18. Thus, the helically-channeled sealing sleeves 32 on the drive side of the shaft 18 will have a different hand from the helically-channeled sealing sleeve 32 on the non-drive side of the shaft 18 on the opposite side of the gear pump 10 that is distal from the drive motor. Thus, during operation of the gear pump 10, polymeric material entering the clearance between the helically-channeled sealing sleeve 32 and shaft 18 tends to travel in the helical channel 32. However, given the opposite orientation of the helix channel 32B, the leaking material is effectively pumped back toward the interior of the pump housing 12 to decrease the likelihood of the material being processed leaking outside of the helically-channeled sealing sleeve 32. For higher viscous material, the helically-channeled sealing sleeve 32 may prevent the leaking of the material being processed. For material with lower viscosity, however, the helically-channeled sealing sleeve 32 may not provide a seal that prevents leakage. The configuration of the helically-channeled sealing sleeve 32, flanged and bolted to the housing 12, provides a mechanical seal while the polymeric material opposed by the helical channels 32B can provide a viscous, relatively static seal. Furthermore, the existence of the polymeric material in the clearance significantly reduces friction therein. Accordingly, such a seal can be highly effective as a seal for gear pumps operating over a considerable range of pressures, temperatures and viscosities.

The helical channel 32B in the internal cylindrical bore 32A$_2$ of the helically-channeled sealing sleeve 32 can comprise a shallow helical channel that extends along at least a substantial portion of the axial length of the helically-channeled sealing sleeve 32 with the helix channel 32B being of generally rectangular cross-sectional configuration. Thus, as explained above, the helical channel 32 can be of a hand such that forward rotation of the shaft 18 within the gear pump 10 during operation results in fluids being processed entering a clearance between the shaft 18 and the internal cylindrical bore 32A$_2$ being effectively pumped back toward an interior of the housing 12 of the gear pump 10.

The helically-channeled sealing sleeves 32 can comprise insertion edges 32D$_1$ that can be chamfered, or radiused, i.e., beveled, at the outer surfaces 32A$_1$ at the distal ends 32D to facilitate insertion of the helically-channeled sealing sleeves 32 into the first and second side plates 12B$_1$, 12B$_2$ as well as installation of static sleeve-housing seals, such as O-rings, 42. In some embodiments, the helically-channeled sealing sleeves 32 can comprise insertion edges 32D$_1$ that can be both chamfered and radiused at the outer surfaces 32A$_1$ at the distal ends 32D In particular, the outer surfaces 32A$_1$ at the distal ends 32D can be curved to allow static sleeve-housing seals, such as O-rings, 42 to more easily slide over the helically-channeled sealing sleeves 32. In some embodiments, the O-rings 42 can be placed in corresponding static seal housing grooves 20 in the first and second side plates 12B$_1$, 12B$_2$. As the helically-channeled sealing sleeves 32 are inserted into the openings in the first and second side plates 12B$_1$, 12B$_2$, the insertion edges 32D$_1$ enters the O-rings 42 in the static housing grooves 20 and the O-rings 42 fit around and then slide over the outer surfaces 32A$_1$ into position when the first and second side plates 12B$_1$, 12B$_2$ are in position against the housing body 12A to form the housing 12. The insertion edges 32D$_1$ of the distal ends 32D allow insertion of the helically-channeled sealing sleeves 32 in the first and second side plates 12B$_1$, 12B$_2$ without damage to the O-ring 42.

Figure 8:
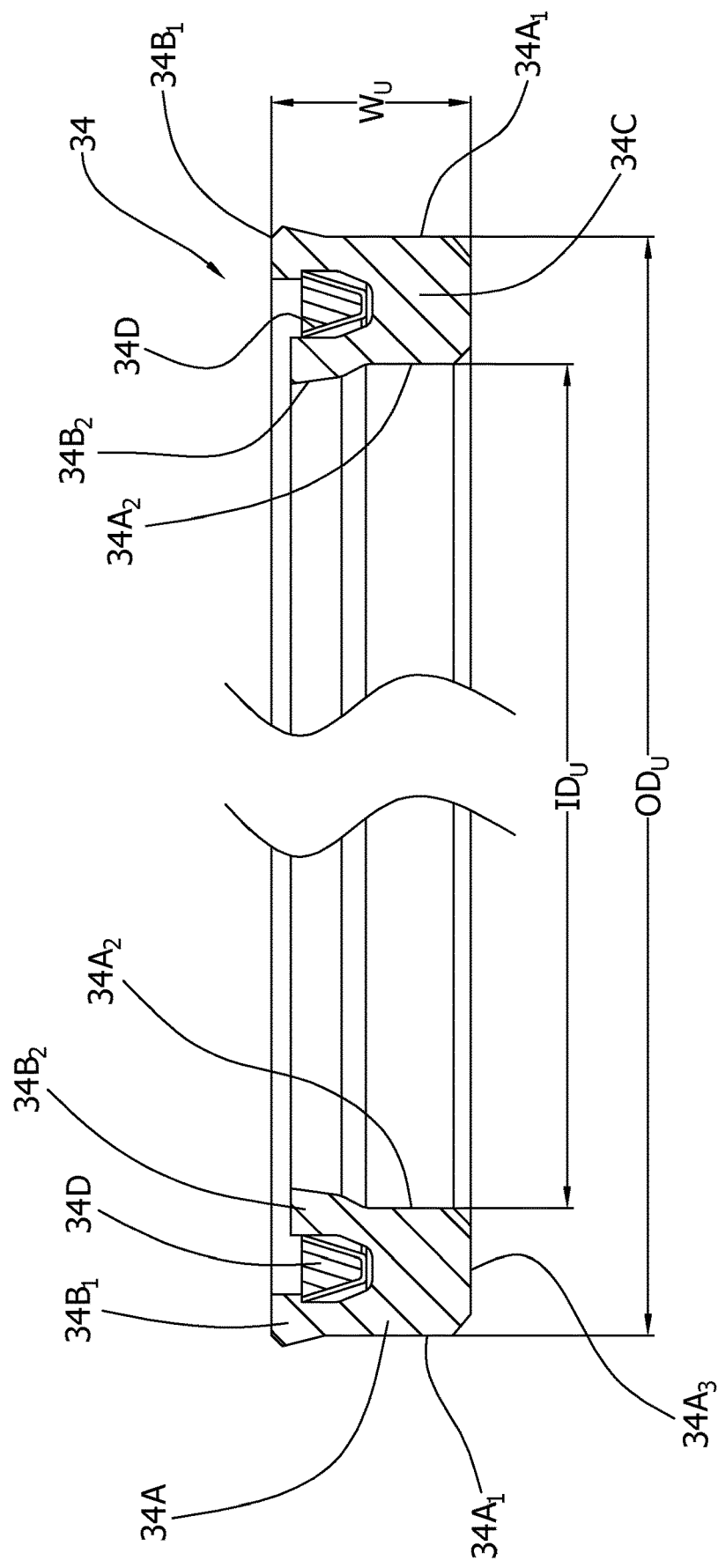
FIG. 8 illustrates a cross-sectional view of an embodiment of a U-seal of a seal system used within an embodiment of the gear pump according to the present subject matter.

Referring to FIGS. 5A, 5B, 7B, and 8, the U-seal 34 of the seal system 30 can comprise an annular body 34A having an outer surface 34A$_1$ and inner surface 34A$_2$. As shown in FIG. 8, the annular body 34A can comprise a center base 34C forming a rear end 34A$_3$ of the U-seal 34 that makes a rear surface that can abut the back-up sealing ring 36 and an outer lip 34B$_1$ and an inner lip 34B$_2$ extending outward from the center base 34C forming a front end of the U-seal 34. The U-seal 34 can be disposed around the cylindrical surface 18A of the driver gear shaft 18 of the gear pump 10 with the inner surface 34A$_2$ of the annular body 34A and the inner lip 34B$_2$ residing against the cylindrical surface 18A of the driver gear shaft 18 within the chamber groove 32C of the helically-channeled sealing sleeve 32. As shown in FIG. 8, the annular body 34A can have an inner diameter ID$_U$ as measured between the inner surface 34A$_2$ that allows for contact of the inner surface 34A$_2$ of the U-seal 34 around the cylindrical outer surface 18A of the drive gear shaft 18 and an outer diameter OD$_U$ as measured between the outer surface 34A$_1$ that allows the outer surface 34A$_1$ of the annular body 34A of the U-seal 34 to reside against an inner surface of the chamber groove 32C of the helically-channeled sealing sleeve 32. The annular body 34A of the U-seal 34 can comprise different materials, for example, the U-seal 34 can comprise PTFE. For instance, the annular body 34A of the U-seal 34 can comprise carbon/graphite filled PTFE.

The annular body 34A of the U-seal 34 can comprise a polymer that comprises an elastomer such that the U-seal 34 is operable as a diaphragm. As shown in FIG. 8, in some embodiments, the U-seal 32 can further comprise an inner spring 34D positioned between the outer and inner lips 34B$_1$, 34B$_2$ of the annular body 34A such that the inner and outer lips 34B$_1$, 34B$_2$ operate as spring-energized sealing lips. The inner spring 34D can be included in the U-seal 34 when the gear pump 10 is processing materials with a melt flow index of above about 1400. The U-seal 34 can retain any fluids being processed within the gear pump 10 or system lubricants in the gear pump 10 that pass into the helically-channeled sealing sleeves 32 to avoid leakage.

The U-seal, or lip seal, 34 can act as a rotary shaft seal, providing sealing for the rotating driver gear shaft 18. The inner spring 34D may or may not be used in the design as stated above. When processing materials with a melt flow index of 1400 and below, the inner spring 34D may not be required.

The seal pressure can be concentrated at the outer and inner lips 34B$_1$, 34B$_2$ of the U-seal 34. The initial seal pressure can be mechanically generated by the inner spring 34D which stops material flow at the U-cup portion of the U-seal 34. As process pressure increases, the seal pressure at the outer lip 34B$_1$ and inner lip 34B$_2$ increases. In a typical U-seal 34, the fluid pressure fills the U-shaped cavity of the U-seal 34 between the outer and inner lips 34B$_1$, 34B$_2$ and applies a sealing pressure against the shaft 18 and the inner surface forming the seal chamber 44 in the chamber groove 32C in the helically-channeled sealing sleeve 32 keeping the fluid from leaking out of the gear pump 10. The annular body 34A of the U-seal 34 can have a width W$_U$. The width W$_U$ is great enough to create a create a strong seal.

In some embodiments, a second U-seal can be added that has its lips facing in the opposite direction of the outer and inner lips 34B$_1$, 34B$_2$ of the U-seal 34 such that the outer and inner lips 34B$_1$, 34B$_2$ of the U-seal 34 face inward toward the gear pump housing 12 and the outer and inner lips of the opposing U-seal face outward away from the gear pump housing 12. These two opposing U-seals can effectively form a dual U-seal, or dual lip seal, that can retain at least one of the fluids being processed within the gear pump 10 or system lubricants in the gear pump 10 to avoid leakage and preclude passage of external contaminants into the gear pump 10 that would be traveling in the opposite direction if a significant pressure drop occurs within the gear pump 10. Such a dual U-seal used in conjunction with the helically-channeled sealing sleeve 32 can also preclude any contamination of the system by external particles or other environmental impacts.

Figure 9:
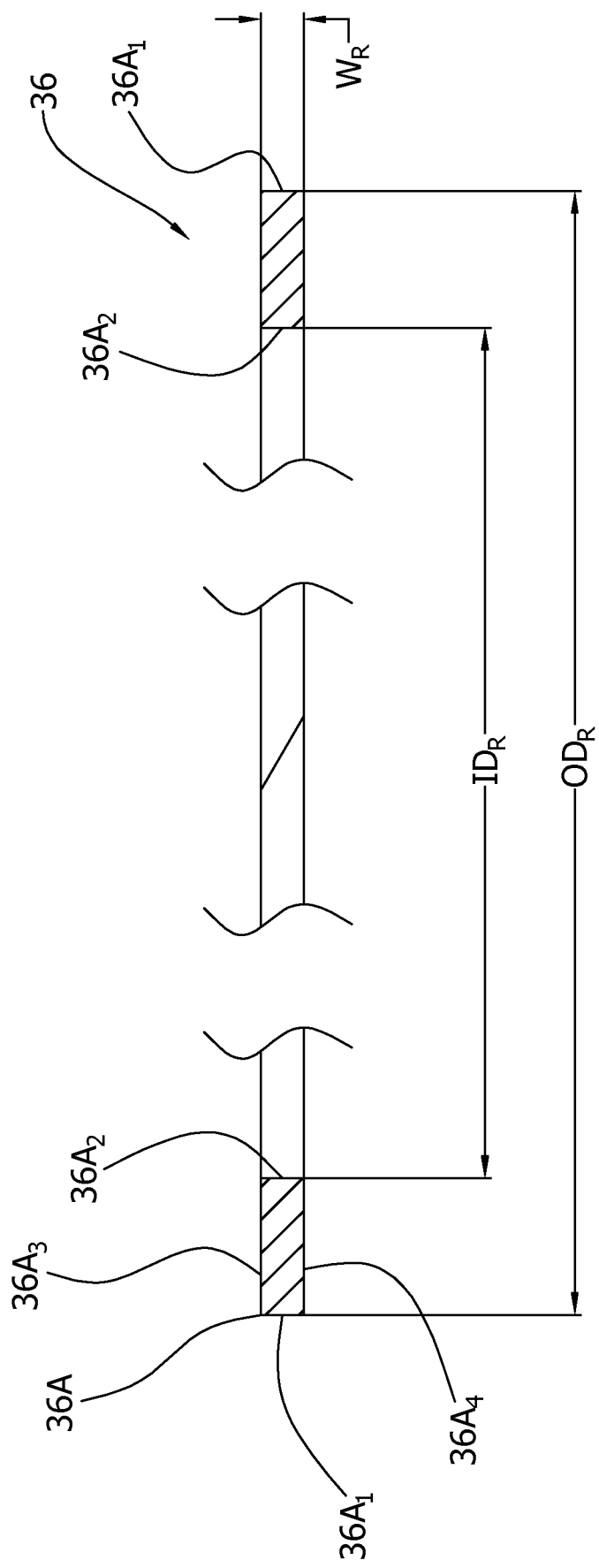
FIG. 9 illustrates a cross-sectional view of an embodiment of a back-up sealing ring of a seal system used within an embodiment of the gear pump according to the present subject matter.

Referring to FIGS. 5A, 5B, 7B, and 9, the back-up sealing ring 36 can comprise an annular body 36A having an outer surface 36A$_1$ and inner surface 36A$_2$. The back-up sealing ring 36 can be disposed around the cylindrical surface 18A of the driver gear shaft 18 of the gear pump 10 with the inner surface 36A$_2$ of the annular body 36A of the back-up ring 36 residing against the cylindrical surface 18A of the driver gear shaft 18 within the chamber groove 32C of the helically-channeled sealing sleeve 32. The back-up sealing ring 36 can have a front surface 36A$_3$ that, when installed, abuts against the center base 34C at the rear end of the U-seal 34 to support the U-seal 34. As shown in FIG. 9, the annular body 36A of the back-up sealing ring 36 can have an inner diameter ID$_R$ as measured between the inner surface 36A$_2$ that allows for a snug fit, i.e., contact, around the cylindrical outer surface 18A of the drive gear shaft 18 and an outer diameter $OD_R$ as measured between the outer surface $36A_1$ that allows the outer surface $36A_1$ of the annular body 36A of the back-up sealing ring 36 to reside against an inner surface of the chamber groove 32C of the helically-channeled sealing sleeve 32. The back-up sealing ring 36 can also have a rear surface $36A_4$ that face outward when installed in the chamber groove 32C.

In some embodiments, the back-up sealing ring 36 can comprise a rigid thermoplastic polymer. In some embodiments, the back-up sealing ring 36 can comprise a metal. In particular, the back-up sealing ring 36 can be manufactured from rigid thermoplastic to support and prevent extrusion of the U-seal 34. For example, the back-up sealing ring 36 can be made from a virgin peek material, allowing the tight fit. Virgin peek is a semi-crystalline high-performance thermoplastic material with outstanding mechanical, thermal and chemical resistance properties, which makes it ideal for sealing applications and as a back up to softer sealing materials or structures, such as the U-seal 34.

Additionally, the follower plate 40 of the seal system 30 as shown in FIGS. 5A, 5B, 7A, and 7B can extend around the cylindrical surface 18A of the driver gear shaft 18 of the gear pump 10 and can be secured to the distal end 32D of the body 32A of the helically-channeled sealing sleeve 32 to close the chamber groove 32C to form the seal chamber 44 within which the U-seal 34 and the back-up sealing ring 36 reside. The follower plate 40 can comprise a support end 44A that, when installed, can reside proximal to the back-up sealing ring 36 and that provide mechanical support to the U-seal 34 and back-up sealing ring 36.

Figure 10:
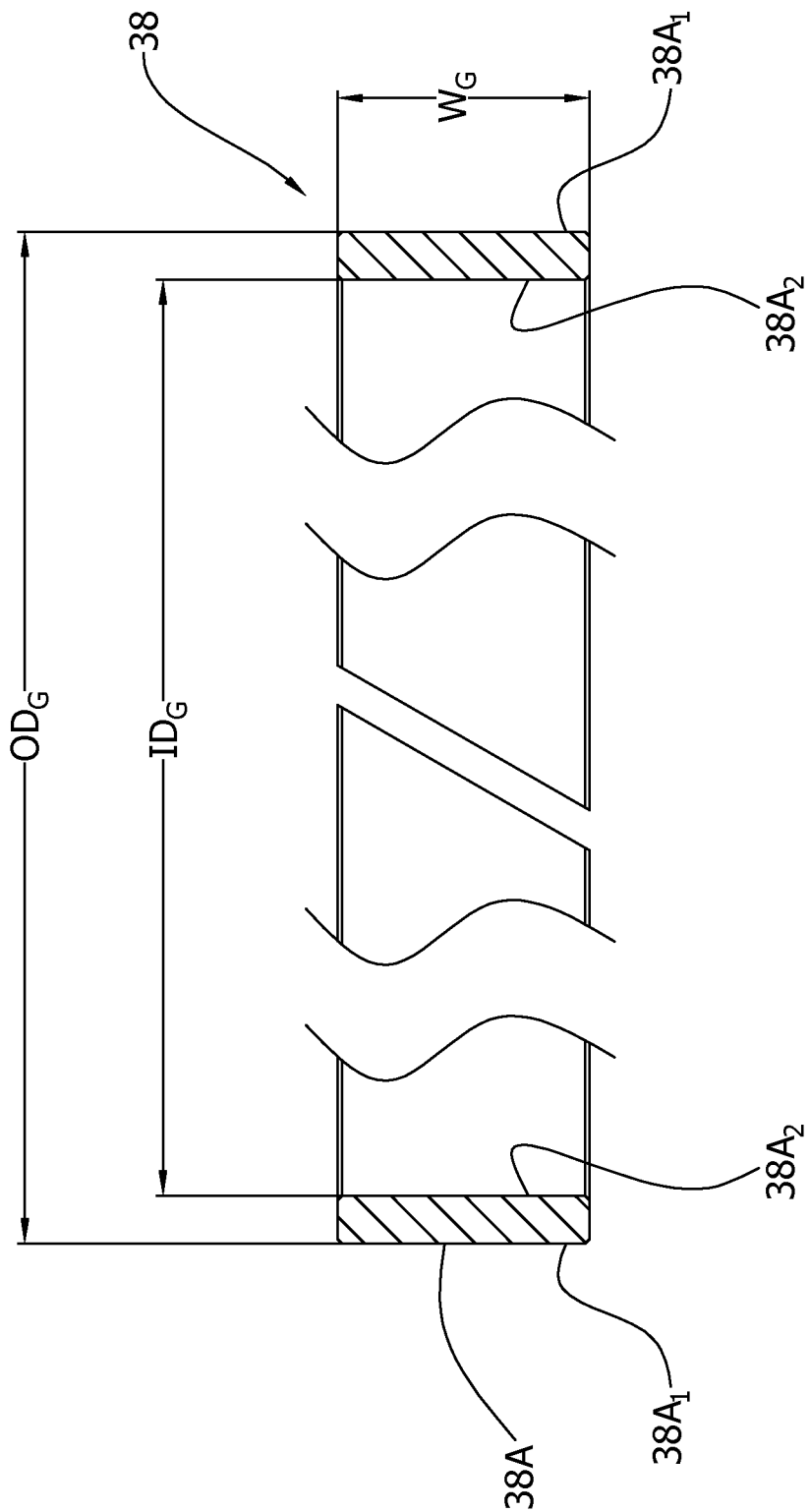
FIG. 10 illustrates a cross-sectional view of an embodiment of a wear guide of a seal system used within an embodiment of the gear pump according to the present subject matter.

As shown in FIGS. 5A, 5B, 7A, and 10, the seal system 30 can also comprise the wear guide 38 that comprises an annular body 38A having an outer surface $38A_1$ and inner surface $38A_2$. To accommodate the wear guide 38, the follower plate 40 can comprise a wear guide chamber 46 in which the wear guide 38 resides. The wear guide 38 can be positioned around the cylindrical surface 18A of the driver gear shaft 18 of the gear pump 10 between the driver gear shaft 18 and the follower plate 40 to prevent metal to metal contact between the follower plate 40 and the drive gear shaft 18 of the gear pump 10. As shown in FIG. 10, the annular body 38A of the wear guide 38 can have an inner diameter $ID_G$ as measured between the inner surface $38A_2$ that allows the wear guide 38 to reside against the cylindrical outer surface 18A of the drive gear shaft 18 and an outer diameter $OD_G$ as measured between the outer surface $38A_1$ that allows the outer surface $34A_1$ of the annular body 34A of the wear guide 38 to reside against an inner surface of the wear guide chamber 46 in the follower plate 40. The wear guide 38 can have a width $W_G$ that permits the wear guide 38 to fit within the chamber 46, for example, tightly fit in the chamber 46.

In some embodiments, the support end 44A of the follower plate 40 can comprise an insertable collar 48 that can be inserted into the deeper groove portion $32C_2$ of the chamber groove 32C of the helically-channeled sealing sleeve 32 to abut against the back-up sealing ring 36. The abutment created by the deeper groove portion $32C_2$ of the chamber groove 32C helps to preserve the seal chamber 44 for the U-seal 34 and the back-up sealing ring 36 after the securement of the follower plate 40 to the helically-channeled sealing sleeves 32. In some embodiments, the depth of the deeper groove portion $32C_2$ of the chamber groove 32C is such that the deeper groove portion $32C_2$ allows the support end 44A of the follower plate 40 to abut and/or support the back-up sealing ring 36 at the rea surface $36A_4$ of the back-up sealing ring 36 without compressing the U-seal 34 and/or the back-up sealing ring 36.

The wear guide chamber 46 can be defined in an inner surface 48A of the insertable collar 48 of the follower plate 40 in which the wear guide 38 can reside when installed. The follower plate 40 can further comprise a securement collar 49 that extends out radially from insertable collar 48 at a distal end of the follower plate 40. The securement collar 49 can have apertures 49A therein for receiving fasteners 49B, such as bolts or screws, that hold the follower plate 40 to the helically-channeled sealing sleeve 32. For example, fasteners 49B can engage the securement apertures 32F in distal end 32D of the helically-channeled sealing sleeves 32. As shown in FIGS. 5A and 5B, a gap 50 can be provided between the securement collar 49 and the distal end 32D of the helically-channeled sealing sleeve 32 to provide clearance to ensure tightening of the follower plate 40 against the helically-channeled sealing sleeve 32.

As stated above, the chamber groove 32C can have a step design with the shallower groove portion $32C_1$ for the seal chamber 44 and the deeper groove portion $32C_2$ for receiving the insertable collar 48 of the follower plate 40 that allows the insertable collar 48 of follower plate 40 to abut the helically-channeled sealing sleeve 32 so that that when the follower plate 40 is tightened to the helically-channeled sealing sleeve 32, it does not compress the back-up sealing ring 36 and the U-seal 34. Thereby, the follower plate 40 can be secured to the helically-channeled sealing sleeve 32 which contains the U-seat 34 and back-up sealing ring 36 to provide a complete seal chamber 44 and to provide mechanical support for the U-seal 34 and back-up sealing ring 36. The follower plate 40, which also includes the wear guide chamber 46 in which the wear guide 38 resides against the surface 18A of the shaft 18, is held to a tight tolerance against the helically-channeled sealing sleeve 32.

Further, the seal system 30 can comprise the static sleeve-housing seal 42 disposed around the driver gear shaft 18 of a gear pump 10 between the outer surface $32A_1$ of the helically-channeled sealing sleeve 32 and the housing 12 of the gear pump 10 as shown in FIGS. 3B and 6. As stated above, the static sleeve-housing seal 42 can comprise one or more O-rings, a sealing epoxy, one or more gaskets, or packing as used in fluid processing apparatuses that is placed between the housing of the fluid processing apparatus and a surface of the helically-channeled sealing sleeve 32 to provide an additional seal between the helically-channeled sealing sleeve 32 and the housing 12. While only shown in detail in FIG. 6 with respect to the first side plate $12B_1$, depending on the configuration of the fluid processing apparatus in which the static sleeve-housing seal 42 is used can be on the drive shaft 18 on one or both sides of the drive gear 16A. For example, in some embodiments, as shown in the gear pump 10, the static sleeve-housing seals 42 can be used in conjunction with both sides of the housing, for example, the first and second side plates $12B_1$, $12B_2$ of the housing 12 of the gear pump 10 as shown in FIG. 3B. In some embodiments, the static sleeve-housing seal 42 can be on just one side of the housing. The description below of the static sleeve-housing seal 42 and its used in the seal system 30 herein is done with respect to both the first and second side plates $12B_1$, $12B_2$ of the housing 12 of the gear pump 10.

Such static sleeve-housing seals 42 can be used in cylindrical chambers to seal the chambers at joints or unions around an interior perimeter of the chamber. In particular, while only shown in the Figures in conjunction with the first side plate $12B_1$, the static sleeve-housing seals 42 act as a stationary, or static, seal between the outer diameter of the helically-channeled sealing sleeves 32 and the first and second side plates 12B$_1$, 12B$_2$ of the housing 12 of the gear pump 10. When processing materials with a melt flow index as high as 1800, material will flow through the press fit and close gap tolerances between the outer surfaces 32A$_1$ of the helically-channeled sealing sleeve 32 and the housing 12 of the gear pump 10. The compression of the static sleeve-housing seals 42 can prevent such material flow between the helically-channeled sealing sleeve 32 and the housing 12 from leaking to atmosphere. When processing materials with a melt flow index of 1400 and greater, the static sleeve-housing seal 42 can comprise an O-ring.

To accommodate the static sleeve-housing seal 42, the static seal housing grooves 20 can be formed in an interior cylindrical surface 15A of the first and second side plates 12B$_1$, 12B$_2$ that is large enough to hold the static sleeve-housing seal 42, whether the static seal is an O-ring, epoxy, packing or a gasket, while still being in contact with and creating a seal around the outer surfaces 32A$_1$ of the helically-channeled sealing sleeves 32 between the outer surfaces 32A$_1$ of the helically-channeled sealing sleeves 32 and the respective first and second side plates 12B$_1$, 12B$_2$ of the housing 12 of the gear pump 10. The static seal housing groove 20 can be cut at a depth and width that keeps the static sleeve-housing seal 42 in contact with the first side plate 12B$_1$ or second side plate 12B$_2$, respectively, and the helically-channeled sealing sleeves 32 when the static sleeve-housing seal 42 and the helically-channeled sealing sleeves 32 are installed in the gear pump 10. The first and second side plates 12B$_1$, 12B$_2$ can have blind locating pin chambers 52 that extend inward from inner faces 15B of the first and second side plates 12B$_1$, 12B$_2$ but do not extend through the entire width of the first and second side plates 12B$_1$, 12B$_2$. The blind locating pin chambers 52 in the first and second side plates 12B$_1$, 12B$_2$ can be aligned with securement and positioning channels 54 in the helically-channeled sealing sleeves 32 that partially form bottom chamber end portions of the blind locating pin chambers 52 such that a locating dowel pin 56 can be press fit into the blind locating pin chambers 52 and into the corresponding securement and positioning channels 54 to hold helically-channeled sealing sleeves 32 in position relative to the first and second side plates 12B$_1$, 12B$_2$ and the housing body 12A of the housing 12. By having the blind locating pin chambers 52 only partial extending into and not all the way through the first and second side plates 12B$_1$, 12B$_2$, room can be provided for the static seal housing groove 20 at a point along the inner circumference of the interior cylindrical surface 15A of the first and second side plates 12B$_1$, 12B$_2$ that is beyond the depth of the blind locating pin chambers 52. Additionally, by not have the blind locating pin chambers 52 extending through the first and second side plates 12B$_1$, 12B$_2$, leak points around the blind locating pin chambers 52 are eliminated.

By having the seal system 30 on either end of the drive shaft with the helically-channeled sealing sleeve 32, the U-Seal 34, back-up sealing ring 36, wear guide 38, and follower plate 40, leakage around the helically-channeled sealing sleeves 32 is prevented and the fluid being processed is forced inward to the gear pump housing 12. The pressure can continue to build and for low-viscosity fluids, the fluid can migrate between the housing body 12, the outer surfaces 32A$_1$ of the helically-channeled sealing sleeves 32, and the first and second side plates 12B$_1$, 12B$_2$. The static sleeve-housing seals, such as O-rings, 42 and the blind locating pin chambers 52 prevent the leakage of the fluid around this outer perimeter of the helically-channeled sealing sleeves 32 or through the first and second side plates 12B$_1$, 12B$_2$ since the blind locating pin chambers 52 do not extend through the first and second side plates 12B$_1$, 12B$_2$.

While the static seal housing groove 20 can be shown in the first and/or second side plates 12B$_1$, 12B$_2$, for example, as shown in FIGS. 3B and 6, it is noted that, in some embodiments, the static seal housing grooves can be in the outer surfaces 32A$_1$ of helically-channeled sealing sleeves 32. For example, the static seal housing grooves in the outer surfaces 32A$_1$ of helically-channeled sealing sleeves 32 can be large enough to hold the static sleeve-housing seals 42 while still being in contact with and creating a seal with the respective first or second side plates 12B$_1$, 12B$_2$. The static seal housing grooves 20 can be cut at a depth and width in the outer surfaces 32A$_1$ of helically-channeled sealing sleeves 32 that keep the static sleeve-housing seals, such as O-rings, 42 in contact with the helically-channeled sealing sleeves 32 and the first side plate 12B$_1$ or second side plate 12B$_2$, respectively, when the static sleeve-housing seal 42 and the helically-channeled sealing sleeves 32 are installed in the gear pump 10. In some embodiments, that use O-rings as the static sleeve-housing seal 42, due to the nature of having to stretch the O-Rings 42 to fit it over the helically channeled sealing sleeves 32 to fit it into the static seal housing groove within the helically-channeled sealing sleeve 32, such an embodiment may not be as preferred in some uses as the embodiment shown in FIG. 6. This preference may also be true for seal system embodiments in which the static sleeve-housing seal 42 is a gasket. In some embodiments, where a sealing epoxy or packing are used as the static sleeve-housing seal 42, the static seal housing groove may be in either the housing 12 or the helically-channeled sealing sleeve 32 depending on user preference.

The embodiments shown in the figures have the housing of a fluid processing apparatus, such as a gear pump, that comprises a housing body in which gears for the fluid processing apparatus reside and first and second side plates on either side of the housing body though which the drive shaft extends with the helically-channeled sealing sleeve being insertable into one of the first side plates or the second side plates. Seal systems as described herein, however, can be used in other embodiments of a fluid processing apparatus. In some embodiments, the one or more helically-channeled sealing sleeves can be inserted into the a receiving portion on the outside of the housing instead of from a rear portion of a side plate such that the helically-channeled sealing sleeve is positioned between the housing body and the side plate. For example, the fluid processing apparatus may have a housing that has a receiving groove on the outside of the housing around an entry opening for a drive shaft that is configured to receive helically-channeled sealing sleeve from the outside of the housing.

For instance, in some embodiments, a seal system for use in fluid processing within a fluid processing apparatus, such as a gear pump, to prevent leakage of a low viscosity fluid can be provided. The seal system can comprise a helically-channeled sealing sleeve disposed around a cylindrical surface of a driver gear shaft of a fluid processing apparatus. The helically-channeled sealing sleeve can be inserted from an exterior of a housing of the fluid processing apparatus into a receiving groove in an outside surface of the housing around an entry opening for a drive shaft such that, once inserted, at least a portion of the helically-channeled sealing sleeve extends between the driver gear shaft and the housing of the fluid apparatus. For example, in some embodiments, the helically-channeled sealing sleeve can have an outer flange that can be seated in a portion of the receiving groove in the housing for securing the helically-channeled sealing sleeve to the housing. The helically-channeled sealing sleeve can comprise a chamber groove at a distal end of the helically-channeled sealing sleeve away from the housing when installed. The seal system can also comprise a U-seal disposed around the cylindrical surface of the driver gear shaft of the fluid processing apparatus residing against the cylindrical surface of the driver gear shaft within the chamber groove of the helically-channeled sealing sleeve. Further, the seal system can comprise a static sleeve-housing seal can be disposed between a surface of the helically-channeled sealing sleeve and the housing of the fluid processing apparatus to further seal the fluid processing apparatus. For example, the static sleeve-housing seal can comprise one or more O-rings, a sealing epoxy, one or more gaskets, or packing as used in fluid processing apparatuses. In some embodiments, such a sealing system can also comprise at least one of a follower plate, a back-up sealing ring and wear guide similar to those described above.

It is note that the description above also provides methods of manufacture, assembly and use of the seal systems provided herein as well as fluid processing apparatuses, such as gear pumps that use such seal systems.

These and other modifications and variations to the present subject matter may be practiced by those of ordinary skill in the art, without departing from the spirit and scope of the present subject matter, which is more particularly set forth herein above. In addition, it should be understood that the aspects of the various embodiments may be interchanged both in whole or in part. Furthermore, those of ordinary skill in the art will appreciate that the foregoing description is by way of example only and is not intended to limit the present subject matter.

What is claimed is:

1. A seal system for use in fluid processing within a fluid processing apparatus, comprising:
   a helically-channeled sealing sleeve comprising a body having an outer surface and an internal cylindrical inner bore that is configured to closely surround a cylindrical surface of a driver gear shaft of a fluid processing apparatus with a helical channel grooved within the internal cylindrical inner bore, the helically-channeled sealing sleeve disposed around the cylindrical surface of the driver gear shaft of the fluid processing apparatus with the body of the helically-channeled sealing sleeve comprising a chamber groove at a distal end of the body away from a housing of the fluid processing apparatus when installed;
   a U-seal comprising an annular body having an outer surface and inner surface with the annular body comprising a center base forming a rear end of U-seal and an inner lip and outer lip extending outward from the center base forming a front end of the U-seal, the U-seal disposed around the cylindrical surface of the driver gear shaft of the fluid processing apparatus when installed with the inner surface of the annular body and the inner lip residing against the cylindrical surface of the driver gear shaft within the chamber groove of the helically-channeled sealing sleeve; and
   a static sleeve-housing seal disposed between the helically-channeled sealing sleeve and the housing of the fluid processing apparatus when installed.

2. The seal system according to claim 1, wherein the U-seal further comprises an inner spring positioned between the inner and outer lips of the annular body such that the inner and outer lips operate as spring-energized sealing lips.

3. The seal system according to claim 2, wherein the U-seal include the inner spring when the fluid processing apparatus is processing materials with a melt flow index of above about 1400.

4. The seal system according to claim 1, wherein the housing of the fluid processing apparatus has a static seal housing groove formed in an interior cylindrical surface in which the static sleeve-housing seal resides during use with the static seal housing groove being cut at a depth and width that keeps the static sleeve-housing seal in contact with the static seal housing groove and the helically-channeled sealing sleeves when the static sleeve-housing seal and the helically-channeled sealing sleeves are installed in the fluid processing apparatus.

5. The seal system according to claim 1, further comprising a back-up sealing ring comprising an annular body having an outer surface and inner surface, the back-up sealing ring disposed around the cylindrical surface of the driver gear shaft of the fluid processing apparatus with the inner surface of the annular body residing against the cylindrical surface of the driver gear shaft within the chamber groove of the helically-channeled sealing sleeve against the center base at the rear end of the U-seal to support the U-seal.

6. The seal system according to claim 5, further comprising a follower plate extending around the cylindrical surface of the driver gear shaft of the fluid processing apparatus and secured to the distal end of the body of the helically-channeled sealing sleeve to close the chamber groove to form a seal chamber within which the U-seal and the back-up sealing ring reside, the follower plate comprising a support end that is proximal to the back-up sealing ring that provides mechanical support to the U-seal and back-up sealing ring.

7. The seal system according to claim 6, further comprising a wear guide composing an annular body having an outer surface and inner surface, the wear guide positioned around the cylindrical surface of the driver gear shaft of the fluid processing apparatus between the driver gear shaft and the follower plate to prevent metal to metal contact between the follower plate and the drive gear shaft of the fluid processing apparatus.

8. The seal system according to claim 7, wherein the support end of the follower plate comprises an insertable collar that is inserted into a portion of the chamber groove of the helically-channeled sealing sleeve to abut against the back-up sealing ring and a wear guide chamber is defined in an inner surface of the insertable collar of the follower plate in which the wear guide resides when installed.

9. The seal system according to claim 6, wherein the chamber groove comprises a two-tiered groove to create an abutment for the follower plate to reside against to ensure space for the seal chamber.

10. The seal system according to claim 6, wherein the housing comprises a housing body in which gears for the fluid processing apparatus reside and first and second side plates on either side of the housing body though which the drive shaft extends, the helically-channeled sealing sleeve is insertable into one of the first side plates or the second side plates.

11. The seal system according to claim 10, further comprising a static seal housing groove formed in an interior cylindrical surface of the first and second side plates that is large enough to hold the static sleeve-housing seal while still being in contact with and creating a seal around the outer surfaces of the helically-channeled sealing sleeves.

12. The seal system according to claim 1, wherein the chamber groove comprises a shallower groove portion on an interior in which the U-seal resides and a deeper groove portion for receiving a follower plate extending around the cylindrical surface of the driver gear shaft of the fluid processing apparatus and secured to the distal end of the body of the helically-channeled sealing sleeve.

13. A seal system for use in fluid processing within a gear pump, comprising:
- a helically-channeled sealing sleeve disposed around a cylindrical surface of a driver gear shaft of a gear pump and at least a portion of the helically-channeled sealing sleeve extending between the driver gear shaft and a housing of the gear pump with the helically-channeled sealing sleeve comprising a chamber groove at a distal end of the helically-channeled sealing sleeve away from the housing when installed;
- a U-seal disposed around the cylindrical surface of the driver gear shaft of the gear pump residing against the cylindrical surface of the driver gear shaft within the chamber groove of the helically-channeled sealing sleeve; and
- a static sleeve-housing seal disposed between the helically-channeled sealing sleeve and the housing of the gear pump.

14. The seal system according to claim 13, wherein the U-seal include the inner spring when the gear pump is processing materials with a melt flow index of above about 1400.

15. The seal system according to claim 13, further comprising a back-up sealing ring disposed around the cylindrical surface of the driver gear shaft of the gear pump within the chamber groove of the helically-channeled sealing sleeve against a rear end of the U-seal to support the U-seal.

16. The seal system according to claim 13, further comprising a follower plate secured to the distal end of the body of the helically-channeled sealing sleeve to close the chamber groove to form a seal chamber within which the U-seal and the back-up sealing ring reside.

17. The seal system according to claim 16, further comprising a wear guide positioned around the cylindrical surface of the driver gear shaft of the gear pump between the driver gear shaft and the follower plate to prevent metal to metal contact between the follower plate and the drive gear shaft of the gear pump.

18. The seal system according to claim 17, wherein the follower plate comprises:
- a support end that is proximal to the back-up seal ring that provides mechanical support to the U-seal and back-up sealing ring, the support end of the follower plate comprises an insertable collar that is inserted into a portion of the chamber groove of the helically-channeled sealing sleeve to abut against the back-up sealing ring; and
- a wear guide chamber defined in an inner surface of the insertable collar of the follower plate in which the wear guide resides when installed.

19. A gear pump comprising:
- a housing;
- a drive gear shaft rotatably disposed in and through at least a portion of the housing;
- a drive gear disposed on the drive gear shaft within the housing;
- a driven gear rotatably disposed in the housing, the driven gear engaged by the drive gear such that as the drive gear is rotated by the drive gear shaft, the driven gear is rotated by the drive gear; and
- a sealing system comprising:
  - a helically-channeled sealing sleeve disposed around a cylindrical surface of the driver gear shaft of the gear pump and extending between the driver gear shaft and the housing of the gear pump with the helically-channeled sealing sleeve comprising a chamber groove at a distal end of the helically-channeled sealing sleeve away from the housing;
  - a U-seal disposed around the cylindrical surface of the driver gear shaft of the gear pump residing against the cylindrical surface of the driver gear shaft within the chamber groove of the helically-channeled sealing sleeve; and
  - a static sleeve-housing seal disposed between the helically-channeled sealing sleeve and the housing of the gear pump.

20. The gear pump according to claim 19, wherein the U-seal comprises an annular body having an outer surface and inner surface with the annular body comprising a center base forming the rear end of U-seal and an inner lip and outer lip extending outward from the center base forming a front end of the U-seal, the U-seal disposed around the cylindrical surface of the driver gear shaft of the gear pump such that the inner surface of the annular body and the inner lip residing against the cylindrical surface of the driver gear shaft.

21. The gear pump according to claim 20, wherein the U-seal further comprises an inner spring positioned between the inner and outer lips of the annular body such that the inner and outer lips operate as spring-energized sealing lips.

22. The gear pump according to claim 19, wherein the sealing system further comprises a back-up sealing ring disposed around the cylindrical surface of the driver gear shaft of the gear pump within the chamber groove of the helically-channeled sealing sleeve against a rear end of the U-seal to support the U-seal.

23. The gear pump according to claim 22, wherein the sealing system further comprises a follower plate secured to the distal and of the body of the helically-channeled sealing sleeve to close the chamber groove to form a seal chamber within which the U-seal and the back-up sealing ring reside.

24. The gear pump according to claim 23, wherein the sealing system further comprises a wear guide positioned around the cylindrical surface of the driver gear shaft of the gear pump between the driver gear shaft and the follower plate to prevent metal to metal contact between the follower plate and the drive gear shaft of the gear pump.

* * * * *